US008473213B2

(12) United States Patent
Zhu et al.

(10) Patent No.: US 8,473,213 B2
(45) Date of Patent: Jun. 25, 2013

(54) METHOD FOR GENERATING ANISOTROPIC RESISTIVITY VOLUMES FROM SEISMIC AND LOG DATA USING A ROCK PHYSICS MODEL

(75) Inventors: Yaping Zhu, Katy, TX (US); Xinyou Lu, Missouri City, TX (US); Shiyu Xu, Kingwood, TX (US); Enru Liu, Sugar Land, TX (US); Michael A. Payne, Spring, TX (US); Carrie X. Zhan, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 537 days.

(21) Appl. No.: 12/865,821

(22) PCT Filed: Mar. 2, 2009

(86) PCT No.: PCT/US2009/035718
§ 371 (c)(1),
(2), (4) Date: Aug. 2, 2010

(87) PCT Pub. No.: WO2009/126375
PCT Pub. Date: Oct. 15, 2009

(65) Prior Publication Data
US 2010/0326669 A1 Dec. 30, 2010

Related U.S. Application Data

(60) Provisional application No. 61/123,526, filed on Apr. 9, 2008.

(51) Int. Cl.
*G01V 1/40* (2006.01)
*G01L 27/00* (2006.01)

(52) U.S. Cl.
USPC ............... 702/7; 702/8; 702/9; 702/100

(58) Field of Classification Search
USPC ............... 702/7–9, 100, 104, 179
See application file for complete search history.

(56) References Cited

U.S. PATENT DOCUMENTS 5,691,958 A    11/1997    Calvert
6,833,699 B2    12/2004    Galford et al.
(Continued)

FOREIGN PATENT DOCUMENTS
WO    WO 2007/001759    1/2007

OTHER PUBLICATIONS

Saunders, J. H. et al. (2005), "Constrained resistivity inversion using seismic data," Geophysics, J. Int. 160, pp. 785-796.*

(Continued)

*Primary Examiner* — Phuong Huynh
(74) *Attorney, Agent, or Firm* — ExxonMobil Upstream Research Company Law Dept.

(57) ABSTRACT

A hydrocarbon exploration method is disclosed for generating anisotropic resistivity models of a subsurface reservoir from seismic and well data using a rock physics model. In one embodiment, the method comprises: selecting wells within a region of interest (101); obtaining a plurality of rock properties (102) and adjusting selected rock parameters (103) in the calibration of the rock physics model at the well locations; inverting porosity and shale content from seismic data (107); propagating the calibrated rock physics model to the region of interest (109) and calculating effective resistivity for the entire region of interest (109). The inventive method also provides for analyzing the uncertainty associated with the prediction of the resistivity volume.

28 Claims, 7 Drawing Sheets

U.S. PATENT DOCUMENTS

| | | | |
|---|---|---|---|
| 7,088,639 B2 | 8/2006 | Walls et al. | |
| 7,093,672 B2 | 8/2006 | Seydoux et al. | |
| 7,373,251 B2 | 5/2008 | Hamman et al. | |
| 7,620,534 B2 | 11/2009 | Pita et al. | |
| 2007/0294034 A1* | 12/2007 | Bratton et al. | 702/6 |

OTHER PUBLICATIONS

Backus, G.E. (1962), "Long-wave elastic anisotropy produced by horizontal layering," *Journal of Geophysical Research* 67, pp. 4427-4440.

Bristow, J.R. (1960), "Microcracks, and the static and dynamic elastic constants of annealed heavily coldworked metals," *British Journal of Applied Physics* 11, pp. 81-85.

Brown, R.J.S, et al. (1975), "On the dependence of the elastic properties of porous rock on the compressibility of the pore fluid," *Geophysics* 40, pp. 608-616.

Carazzone, J.J. et al. (2005), "Three dimensional imagining of marine CSEM data," 75th Annual International Meeting, *SEG, Expanded Abstracts*, pp. 575-578.

Carcione, J.M. et al. (2007), "Cross-property relations between electrical conductivity and the seismic velocity of rocks," *Geophysics* 72, pp. 193-204.

Gassmann, F. (1951), "Elastic waves through a packing of spheres," *Geophysics* 16, pp. 673-685.

Haber, E. et al. (2001), "Fast finite volume simulation of 3D electromagnetic problems with highly discontinuous coefficients," *SIAM J. Sci. Computing* 22 (6), pp. 1943-1961.

Hacikoylu, P. et al. (2006), "Resistivity-velocity transforms revisited," *The Leading Edge* 25, pp. 1006-1009.

Hill, R. (1963), "Elastic properties of reinforced solids: Some theoretical principles," *Journal of the Mechanics and Physics of Solids* 11, pp. 357-372.

Hornby, B. et al. (1994), "Anisotropic effective-medium modeling of the elastic properties of shales," *Geophysics* 59 (10), pp. 1570-1583.

Hoversten, G.M. et al. (2001), "Reservoir characterization using crosswell electromagnetic inversion: A feasibility study for the Snorre field, North Sea," *Geophysics* 66 (4), pp. 1177-1189.

Jizba, D.L. (1991), "Mechanical and Acoustical Properties of Sandstones and Shales," A Dissertation submitted to the Dept. of Geophysics & Comm. Of Graduate Studies of Stanford University, 260 pgs.

Kachanov, M. et al. (2001), "Explicit cross-property correlations for porous materials with anisotropic microstructures," *Journal of the Mechanics and Physics of Solids* 49, pp. 1-25.

Kuster, G.T. (1974), "Velocity and attenuation of seismic waves in two phase media, Part 1: Theoretical formulation," *Geophysics* 39, pp. 587-606.

Mendrofa, D.M.F. et al. (2007), "An analytical formulation of seismic-derived resistivity," *American Association of Petroleum Geologists Bulletin* 91, 8 pages.

Nishizawa, O. et al. (2001), "Seismic velocity anisotropy in mica-rich rocks: an inclusion model," *Geophys. J. Int.* 145, pp. 19.

Pointer, T. et al. (2000), "Seismic wave propagation in cracked porous media," *Geophysical Journal International* 142, pp. 199-231.

Portniaguine, O. (2006), "Building electromagnetic model using seismic reflectivity," 76th Annual International Meeting, *Seg Expanded Abstracts*, pp. 840-843.

Roberts, R. et al. (2005), "Hybrid inversion techniques used to drive key elastic parameters: A case study from the Nile Delta," *The Leading Edge*, pp. 86-92.

Saltzer, R.L. (2005), "Predicting Vshale and porosity using cascaded seismic and rock physics inversion," *The Leading Edge* 24, pp. 732-736.

Saunders, J.H. et al. (2005), "Constrained resistivity inversion using seismic data," *Geophys. J. Int.* 160, pp. 785-796.

Sen, P.N. et al. (1981), "A self-similar model for sedimentary rocks with applications to the dielectric constant of fused glass beads," *Geophysics* 46, pp. 781-795.

Szymanski, A. et al. (1994), "Field and numerical study of water flow in fissured aquifers," *Transport and Reactive Processes in Aquifers, Dracos & Stauffer (eds)*, Balkema, Rotterdam, ISBN 90 5410 368 X, pp. 383-387.

Thomsen, L. (1986), "Weak elastic anisotropy," *Geophysics* 51, pp. 1954-1966.

Thomsen, L. (1995), "Elastic anisotropy due to aligned cracks on porous rock," *Geophysical Prospecting* 43, pp. 805-829.

Tran, N.H. et al. (2007), "Utilisation of Seismic and Resistivity Data for Fracture Characterization and Simulation," Proceedings of the 9$^{th}$ WSEAS Int'l. Conf. on Automatic Control, Modeling & Simulation, Istanbul, Turkey, May 27-29, 2007, pp. 178-183.

Vernik, L. et al. (2002), Estimation of Net-to-Gross from P and S Impendance: Integration of Petrophysics and 3D Seismic Inversion, AAPG Annual Meeting, Houston, Texas, Mar. 10-13, 2002, pp. 1-7.

Wang, T. (2006), "A weak-anisotropy approximation to multicomponent induction responses in cross-bedded formations," *Geophysics* 71, pp. F61-F66.

Waxman, M.H. (1968), "Electrical conductivities in oil-bearing shaley sands," *The Society of Petroleum Journal* 8, pp. 107-122.

Willis, J.R. (1977), "Bounds and self-consistent estimates for the overall properties of anisotropic composite," *Journal of Mechanics and Physics of Solids* 25, pp. 185-202.

Xu, S. (1995), "A new velocity model for clay-sand mixtures," *Geophysical Prospecting* 43, pp. 91-118.

Xu, S. (1996), "A physical model for shear-wave velocity prediction," *Geophysical Prospecting* 44, pp. 687-717.

Xu, S. (1998), "Permeability prediction in anisotropic shaly formations, In Core-Log Integration," *London Geological Society* Special Publication No. 136, pp. 225-236.

Zatsepin, S. et al. (1997), "Modelling the compliance of crustal rock—I. Response of shear-wave splitting to differential stress," *Geophys. J. Int.* 129, pp. 477-494.

International Search Report and Written Opinion, dated Apr. 30, 2009, PCT/US2009/035718.

* cited by examiner

METHOD FOR GENERATING ANISOTROPIC RESISTIVITY VOLUMES FROM SEISMIC AND LOG DATA USING A ROCK PHYSICS MODEL

CROSS REFERENCE TO RELATED APPLICATION

This application is the National Stage entry under 35 U.S.C. 371 of PCT/US2009/035718 that published as WO 2009/126375 and was filed on 2 Mar. 2009, which claims the benefit of U.S. Provisional Application No. 61/123,526, filed on 19 Apr. 2008, each of which is incorporated by reference, in its entirety, for all purposes.

FIELD OF THE INVENTION

The present invention relates generally to the field of hydrocarbon exploration, i.e. prospecting for accumulations of oil or gas. More particularly, the invention concerns geophysical mapping of subsurface rock properties. Specifically, the present invention is a method of predicting electrical properties by incorporating information from seismic and well log data, and by using rock physics models that link rock properties to geophysical responses.

BACKGROUND OF THE INVENTION

Elastic and electrical properties are among the most valuable geophysical information that the oil industry has been using to characterize the earth's subsurface in the exploration and development of hydrocarbon reservoirs. By elastic properties, it is meant the behavior of the medium associated with the reversible deformation under stress or strain, e.g., seismic velocity. By electrical properties, it is meant the behavior of the medium associated with the presence and flow of electric charge, e.g., resistivity or conductivity. In hydrocarbon exploration, these two types of properties are mainly derived from seismic, controlled-source electromagnetic (CSEM), and well data. While seismic data remain the major source of information for oil exploration, electromagnetic (EM) data have generated growing interest because of their sensitivity to variation in fluid saturation, thus enabling the discrimination between water, which is more conductive, and hydrocarbons, which are more resistive.

Rocks are generally considered as compositions of different types of minerals with fluids contained in the pore spaces. Hence, geophysical response (seismic, electromagnetic, or thermal) is primarily controlled by the interaction among various constituents such as grain minerals, cements, pore spaces, and fluids. Rock physics models provide crucial links between the microscopic rock properties and macroscopic physical responses such as seismic velocity and resistivity. Though it is not practical and in fact impossible to include all factors in a rock physics model, some key rock parameters can be identified, including mineralogy, porosity, pore structure, and fluid properties. For example, fluid properties are largely governed by temperature and pressure profiles as well as compositional environment such as salinity, API gravity, fluid saturation, gas-oil ratio (GOR), and gas gravity. Pore structure, such as shape, orientation and connectivity, largely influences the overall anisotropy of seismic velocity and resistivity. Hence, a consistent rock physics model helps to better understand the relationship between the rock parameters and the overall geophysical responses. It further implies that one type of physical response can be derived from other types of response given appropriate rock physics relationship and sufficient information about rock parameters.

Seismic anisotropy has been widely observed in the earth's subsurface. For example, shale comprises significant volume of the elastic fill of sedimentary basins, and produces transverse isotropy (TI), which is the most common type of anisotropy. Furthermore, many hydrocarbon reservoirs are relatively deep and have undergone tremendous overburden forces as well as local stresses. In many cases, such forces exceed the strength of the rocks and open up fractures in the rocks, resulting in stress-induced anisotropy. Depending on the number of fracture sets and fracture orientation, anisotropy varies from HTI (transverse isotropy with horizontal symmetry axis), orthorhombic, to the even more complicated monoclinic or triclinic type. From the rock physics point of view, seismic anisotropy can result from preferred alignment of mineral grains and pore spaces, from preferred direction of fluid flow among pore spaces, and from intrinsic seismic anisotropy of minerals.

Early observations of resistivity anisotropy were noted by the discrepancy between surface measurements in different directions. Similar to velocity, resistivity anisotropy may result from preferred orientation of mineral grains and pore spaces, from preferred direction of current flow among pore spaces, and from intrinsic resistivity anisotropy. Since resistivity is sensitive to fluid type, spatial distribution of fluids in the rocks also contributes to the effective resistivity anisotropy. In a vertical well that penetrates horizontal bedding layers, vertical resistivity from cross-dipole measurements is always at least as much as, if not greater than, horizontal resistivity. It is important to know that elasticity is represented by a fourth-rank tensor while resistivity is represented by a second-rank tensor, which means that resistivity anisotropy may have simpler mathematical forms, e.g., isotropy, transverse isotropy, and orthorhombic symmetry.

Many existing theoretical rock physics models are devoted to seismic velocity anisotropy (e.g., Brown and Korring a, 1975; Hamby et al., 1994; Xu and White, 1995; Thomsen, 1995; Pointer et al., 2000) and the isotropic seismic-to-resistivity transformation (e.g., Bristow, 1960; Sen et al., 1981; Kachanov et al., 2001; Hacikoylu, 2006). However, very few studies have been found on resistivity anisotropy itself (e.g., Wang, 2006) and the transformation between velocity and resistivity anisotropy. Carcione et al. (2007) discussed possible ways of combining constitutive equations of different physical properties to obtain relationship between seismic and electrical properties. For example, Archie's law for resistivity combined with the Gassmann equation or the time-average equation are two possible choices. Rock physics models cited by Carcione et al. (2007) may be basically applied to sand-shale sequences and are not directly applicable to more complicated cases such as fractured and carbonated rocks. Moreover, no discussion is provided for partial saturation cases, which is commonly encountered in hydrocarbon reservoirs.

3D inversion has been widely used in EM data interpretation. It generally involves iterative forward modeling (numerically solving Maxwell's equations) and comparing to measured EM data, then updating the resistivity model for the next iteration. To start the iteration process, an initial guess of the resistivity model is needed. Current approaches for building a resistivity model generally depend on the availability of the data and the experience of the practitioners. For example, if neither seismic nor well data are available, model builders may choose a homogeneous half-space or layered model. Sometimes they use rectangular blocks and assign random values as an initial guess of the resistivity structure (Haber and Ascher, 2001). Other approaches may use the information from corresponding seismic data, e.g., constructing an initial resistivity model (sometimes called a starting model or a background model) by digitizing the horizons from seismic amplitude maps and then assigning values according to values from resistivity logs (Carazzone et al., 2005). Because 3D EM inversion is nonlinear, inversion results can be easily trapped into a local minimum (i.e., an inverted resistivity model that differs significantly from the true resistivity structure), particularly if the initial guess is not good. Thus, even when the initial guess is from seismic data, the final result from EM inversion does not always honor seismic data.

When log data are available, resistivity volumes can be constructed by linear interpolation of resistivity between well locations (Hoversten et al., 2001). This approach is based on an empirical relationship between observed well log and laboratory data. Portniaguine et al. (2006) suggest building the model from seismic impedance volumes by assuming a linear empirical relationship between seismic impedance and logarithm of conductivity. Their purpose was to build a reference model for forward modeling of EM response over hydrocarbon reservoirs. The procedure is firstly to invert the impedance from seismic data, then do a linear regression between impedance and logarithm of resistivity in a crossplot, and finally extend such empirical relation to the whole volume.

Mendrofa and Widarsono (2007) discuss the possibility of building the seismic-resistivity relationship by first rearranging the Gassmann (1951) equation to establish the transformation between velocity and water saturation, and then converting water saturation to resistivity. However, their approach is limited to the Gassmann model and is only applicable to isotropic resistivity, which is a special case discussed by Carcione et al. (2007). Moreover, the lack of methods on how to obtain the porosity for locations away from well sites, which is a key parameter in the derivation of water saturation from velocity, limits the application of this approach to generating volumes of resistivity.

In summary, currently known approaches for resistivity modeling appear to be either empirical or semi-empirical and lack the capability to handle anisotropic resistivity, which has been frequently observed in EM data and has been shown to have significant effects on resistivity imaging. In many cases, the current methods do not provide a direct physical link between resistivity behavior and rock-fluid properties. There is a need in hydrocarbon exploration for a method that can generate 3D anisotropic resistivity volumes by incorporating information from different measurements (seismic, electromagnetic, well log, cores). Preferably, such a method should be able to quantify the uncertainty of predicted resistivity data from scenario analysis of a number of rock parameters. In certain idealized cases, such a method should provide a resistivity volume with resolution comparable to the data volumes of seismic attributes such as porosity and seismic impedance. As compared to inversion results of EM data, a resistivity volume derived from such a method should provide more details of reservoir rocks. The present invention satisfies this need.

SUMMARY OF THE INVENTION

A method for generating anisotropic resistivity models from rock properties inverted from seismic data is described. The method utilizes well log data to constrain a rock physics model that relates rock properties to seismic and electrical responses. Once the parameters are calibrated, the rock physics model gives a relationship between rock properties and geophysical (seismic and EM) responses and can be used to predict one geophysical response from the other, which can be applied to any geologic formation of which such relationship is typical.

In one embodiment, the invention is a method for predicting an anisotropic electrical property of a subsurface region from seismic and well data, wherein the term well data can include well logs or core analyses or both from at least one well in the subsurface region, comprising the following steps:

(a) choosing a mathematical form of a rock physics model relating both elastic and electrical properties to rock properties of the subsurface region, and able to predict anisotropic behavior in a subsurface region being modeled;

(b) calibrating the model by using well data from one or more wells; and (c) using the model and location dependent rock properties obtained from inverting seismic data to predict values of an electrical property at a plurality of locations away from the one or more wells in the subsurface region.

In a second embodiment characterized by being somewhat more specific than the first embodiment, the invention is a method for predicting anisotropic resistivity in a subsurface region from seismic and well data, wherein the term well data can include well logs or core analyses or both from at least one well in the subsurface region, comprising the following:

(a) choosing a mathematical form of a rock physics model relating effective values of elastic and electrical properties to in-situ (i.e. microscopic) rock properties of the subsurface region, and able to predict anisotropic behavior in a subsurface region being modeled;

(b) calibrating the rock physics model using well data measuring elastic and electrical properties of the subsurface region at one or more well locations;

(c) obtaining data volumes for shale content and porosity from inversion of the seismic data;

(d) interpolating or extrapolating the calibrated rock physics model away from the at least one well; and (e) generating a resistivity tensor data volume using the seismic-derived shale content and porosity volumes and the calibrated rock physics model.

DETAILED DESCRIPTION OF EXAMPLE EMBODIMENTS

Figure 1:
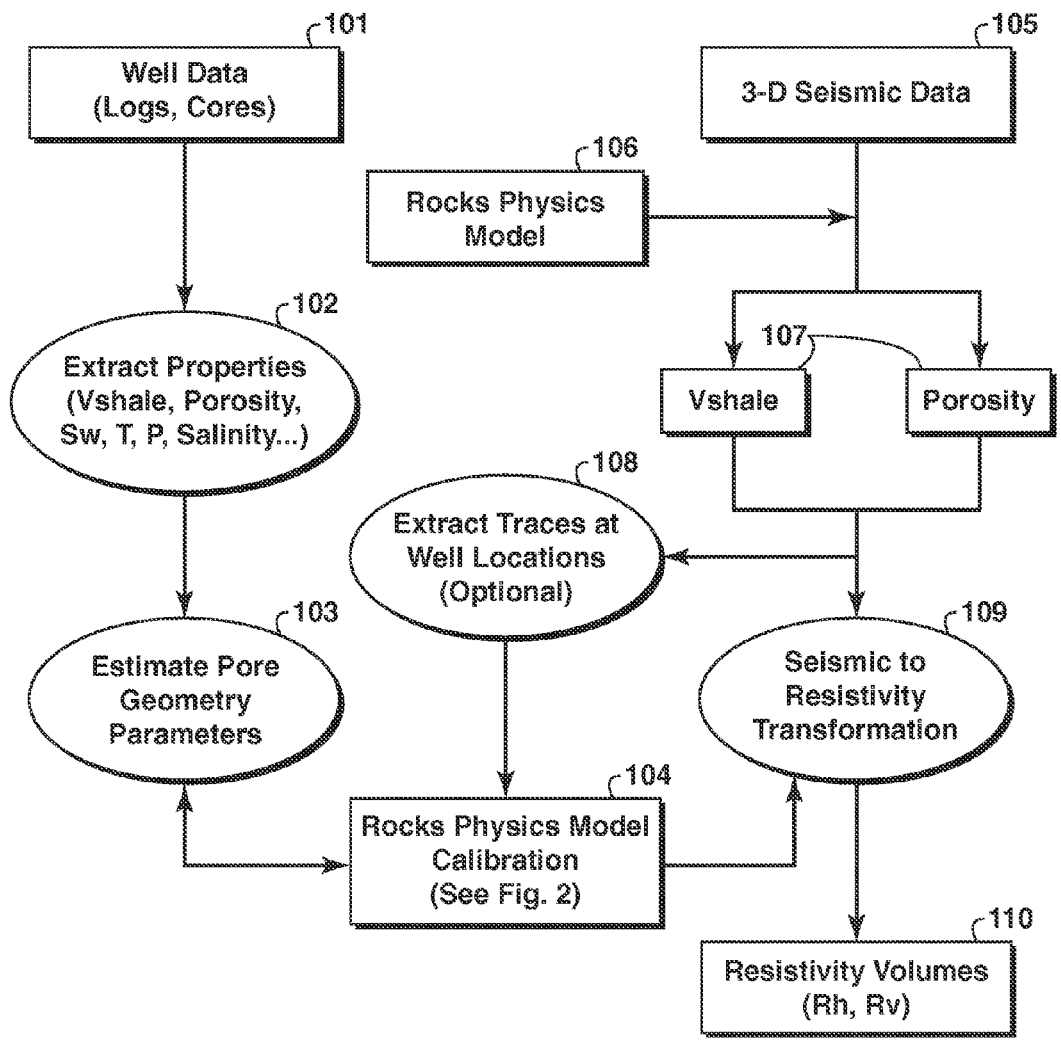
FIG. 1 is a workflow of an embodiment of the invention.

Predicting one physical property from another is important in the sense that it offers a possibility of inferring a property that is more difficult to estimate from a second property that has proved to be easier and more reliable to estimate. It also provides calibration of the measurements. In principle, the transformation between seismic velocity and resistivity is possible, i.e., by knowing anisotropic velocity, to obtain anisotropic resistivity, and vice versa. In practice, however, one may more profitably look for a way to predict resistivity from seismic data instead of predicting velocity from resistivity data because 3D resistivity data have much lower resolution.

In principle, cross-property relationships between velocity anisotropy and resistivity anisotropy can be achieved if an appropriate anisotropic rock physics relationship (i.e., an anisotropic constitutive equation) for velocity and resistivity is established. However, it is important to realize that different physical responses depend on different sets of rock parameters, which means that the transformation between velocity and resistivity is generally nonlinear and non-unique. For example, fluid salinity can have significant influence on resistivity, but probably negligible influence on seismic velocity. Simple cross-plotting of different properties may not represent the true rock physics relationship.

Another important issue is to provide background models for the inversion of electromagnetic (EM) data, which help to characterize the spatial distribution of conductivity (or resistivity) of the subsurface. Due to the complexity and nonlinear nature of the EM inversion, iterative methods have been widely used to solve the inverse problem. The method first provides a model as an initial guess and then updates the model until an acceptable match is obtained between the acquired and predicted data. For this reason, the inversion results generally depend on the starting model. A bad choice of a starting model can cause inversion results to be trapped in a local minimum, while a good choice of the model helps an inversion to proceed in the direction to the global minimum, thus obtaining the results that are close to the true subsurface resistivity structures. One advantageous use of the present inventive method is to generate an initial resistivity model for inversion of electromagnetic survey data.

Broadly speaking, the present invention is a method for generating anisotropic (or isotropic) resistivity data volumes from seismic and well log (and/or core) data using a calibrated rock physics model. One or more wells along with 3D seismic data (for example, in the form of partial angle stacks) are selected for the subsurface region of interest. The well data and seismic data are integrated, and a rock physics model is selected and calibrated at the well locations and then extended to the entire region of interest to simulate the physical responses such as elastic and electrical properties.

In a first embodiment of the inventive method, resistivity volumes are determined from seismic-derived porosity and shale volumes using the appropriate rock physics relationship. Basic steps in this embodiment include: (a) the region of interest and one or more wells therein are selected; (b) a suitable rock physics model is selected and then calibrated using well log information for the well sites, which involves steps (c)-(e): (c) extraction of rock parameters from well log data, including shale content, porosity, fluid saturation, pressure, temperature, and salinity; (d) calibration of rock parameters using well log and core measurements, including bulk and shear moduli as well as density for grain minerals, pore shape, pore orientation, and pore connectivity; (e) comparison of the rock physics model's prediction with available log measurements, including P- and S-wave log data and resistivity log data (steps (d) and (e) are iterated if necessary); (f) volumes of shale content (Vshale) and porosity are inverted independently from seismic data corresponding to the region of interest, and these two data volumes are then used as input to the calibrated rock physics model; (g) the rock physics relationship embodied in the calibrated model is then extended to the entire region of interest, for example (in the case of a region with multiple wells) by a linear interpolation of input parameters of rock properties at well locations; and (h) calculation of resistivity volumes using the determined rock physics relationship for the region of interest.

In an alternative embodiment of the present inventive method, a resistivity volume can be generated by using 100% water saturation instead of a measured water saturation log. Such a resistivity volume may be called the resistivity background trend. In this embodiment, step (d) is modified with the assumption of 100% water saturation for the entire region and then calibration of rock parameters using well log and core measurements, including bulk and shear moduli as well as density for grain minerals, pore shape, pore orientation, and pore connectivity. Moreover, step (h) is modified as calculating resistivity volumes using the determined rock physics relationship (with the assumption of 100% water saturation) for the region of interest.

In another alternative embodiment of the present inventive method, volumes of porosity and Vshale, as well as pore geometry (aspect ratio and orientation distributions), are determined through the calibration of the same rock physics model from which the resistivity volumes are predicted. In this embodiment, steps include (a) the region of interest and one or more wells are selected; (b) rock parameters, including shale content, porosity, fluid saturation, pressure, temperature, and salinity, are extracted from log data and/or core measurements at the well location; (c) other rock parameters, including pore geometry (shape and orientation distributions) and elastic properties of grain minerals and pore fluids, are calibrated by comparing rock physics prediction results with available log measurements of sonic log and resistivity log data; (d) the calibrated rock physics model from the preceding step is used for inversion of Vshale and porosity volume from seismic data; and (e) the same calibrated rock physics model, with the seismic-derived Vshale and porosity, are used for generating resistivity volumes for the region of interest.

The present invention embodies a realization that a rock physics model can be used to link the in-situ (i.e. microscopic) rock properties (such as Vshale and porosity) to the two physical properties (elastic and electrical properties), and hence to establish the relationship between these two physical properties. The use of any model that does this is within the scope of the invention. The model might use empirical methods such as cross-plotting of different properties, or the model could be a theoretical model such as those based on differential effective medium (DEM) theory or self-consistent (SC) theory. In a preferred embodiment, the model is one that can be used to calculate an effective property (e.g., the effective elastic moduli and effective conductivity) as a function of the volume fractions of each constituent along with other parameters such as spatial distribution of each constituent. An effective property is that value of the property that makes a homogeneous medium equivalent to the actual region being modeled. Suitable models typically require the following information for each constituent: 1) volume fraction; 2)

physical properties such as elastic moduli, density, and resistivity; and 3) geometrical details, such as aspect ratio, orientation, and spatial distribution. In current model-building approaches, such information is typically extracted from a plurality of well logs, from core analysis, or from past experience of the practitioners. Furthermore, in preferred embodiments, the model must be able to predict anisotropic behavior that has been widely observed in the earth's subsurface, i.e., significant anisotropic character.

The present invention also embodies a realization that different types of geophysical responses (elastic and electrical) can depend on different sets of rock parameters, which means that the conversion between seismic velocity and resistivity are generally nonlinear and non-unique. For example, fluid salinity and temperature can have significant influence on resistivity, but probably negligible influence on seismic velocity.

As used herein, elastic properties include velocity and sonic transit time (which is the inverse of velocity), while electrical properties include resistivity and conductivity (which is the inverse of resistivity).

Among many types of rock properties, two important parameters that influence both velocity and resistivity are porosity and shale content (the shale volume fraction, customarily called Vshale). Since a rock physics model suitable for the present inventive method needs to be calibrated using well data (meaning well logs or core analyses or a combination of both) and applied to forward calculate effective properties, information about porosity and shale content are derived from both well data and seismic data. For example, in the calibration of the rock physics model, a Vshale log can be estimated from sources including, but not limited to, gamma ray, neutron-density crossplot, or spontaneous potential (SP) logs, while a porosity log can be estimated from sources including, but not limited to, density, acoustic, neutron, or nuclear magnetic resonance (NMR) logs. (See the discussion of step 102 below.) In the forward calculation of effective properties using seismic information, Vshale and porosity volumes can be obtained from the inversion of 3D seismic data, for example, by inverting for elastic properties and then relating these properties to porosity and Vshale (step 107 below).

Figure 2:
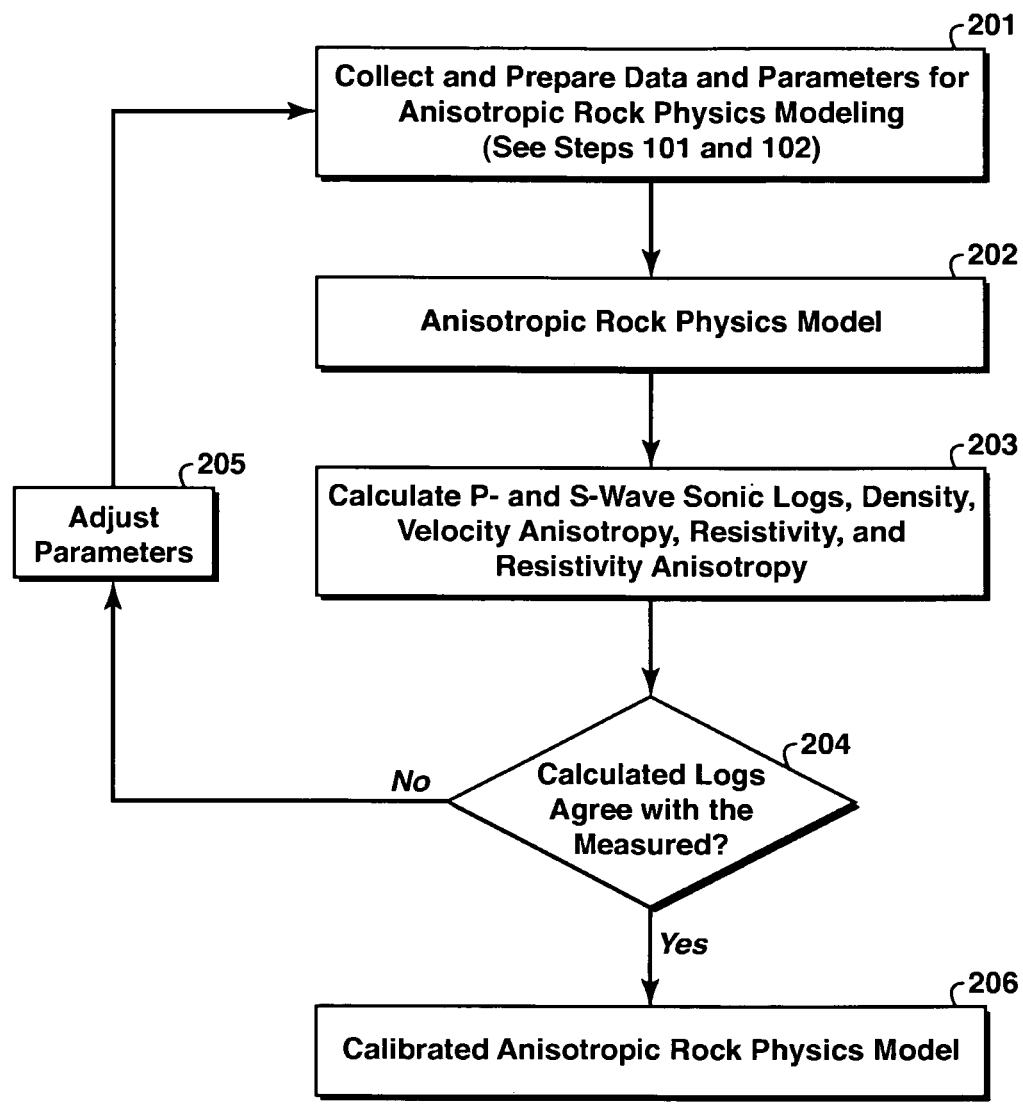
FIG. 2 shows a flow chart of the calibration of a rock physics model using log measurements.

Next follows a more detailed discussion of rock physics models (and their construction) that are suitable for the present invention, i.e. can be used at step 104 of FIG. 1 and step 202 of FIG. 2, and also at step 106, of FIG. 1. A preferred embodiment of the present inventive method uses a rock physics model based on a modified algorithm of Willis's (1977) formula, which estimates upper and lower bounds of the effective physical properties (e.g., stiffness, conductivity, permeability, and thermal conductivity) of rocks. The original Willis formula, based on variation principle, was derived for calculating the generalized Hashin-Strikman bounds for a composite medium containing perfectly aligned multi-phase inclusions. Consider a rock sample consisting of n compositional phases, where $c_r$ is the volume fraction and $L_r$ is the material property tensor for the r-th phase. The effective property tensor is given by $$L = \sum_{r=1}^{n} c_r L_r [I + P_0(L_r - L_0)]^{-1} \left\{ \sum_{r=1}^{n} c_r [I + P_0(L_r - L_0)]^{-1} \right\}^{-1}, \quad (1)$$

where I is the unit tensor, $L_0$ is the property tensor of a hypothetical reference medium having vanishing volume, and $P_0$ is a tensor that is a function of pore geometry and the properties of the reference medium. Depending on the choice of the reference medium, the predicted effective material property varies between the generalized Hashin-Strikman bounds. For example, if the most conductive phase is chosen as the reference medium, one gets the upper bound for the effective conductivity whereas; if the least conductive phase is chosen, one gets the lower bound. The contribution of the r-th phase, whether it be a grain particle or pore fluid, is expressed through the volume fraction and property tensor for such a phase, as well as its geometry (e.g., the aspect ratio for a pore) that is related to the tensor $P_0$.

Consider a rock sample with an isotropic background (conductivity=$L_1$) percolated with one type of spheroidal inclusions (conductivity=$L_2$) that are isotropic and perfectly aligned vertically. Willis's formula yields the effective conductivity of transverse isotropy with vertical symmetry (VTI), $$L_{11} = \left\{ \frac{c_1 L_1}{1 + P_{11}(L_1 - L_{11}^0)} + \frac{c_2 L_2}{1 + P_{11}(L_2 - L_{11}^0)} \right\} \cdot \quad (2)$$
$$\left\{ \frac{c_1}{1 + P_{11}(L_1 - L_{11}^0)} + \frac{c_2}{1 + P_{11}(L_2 - L_{11}^0)} \right\}^{-1},$$

$$L_{33} = \left\{ \frac{c_1 L_1}{1 + P_{33}(L_1 - L_{33}^0)} + \frac{c_2 L_2}{1 + P_{33}(L_2 - L_{33}^0)} \right\} \cdot \quad (3)$$
$$\left\{ \frac{c_1}{1 + P_{33}(L_1 - L_{33}^0)} + \frac{c_2}{1 + P_{33}(L_2 - L_{33}^0)} \right\}^{-1},$$

where $c_1$ and $c_2$ are, respectively, the volume percentage of the background and of the inclusions. The reference medium is selected as VTI with $L_{22}^0 = L_{11}^0$. Tensor $P_0$ is then given as $$P_{11} = \frac{\lambda^2}{2L_{11}^0}\left[1 - \frac{\alpha^2 L_{33}^0}{2L_{11}^0}\lambda \ln\left(\frac{\lambda+1}{\lambda-1}\right)\right], \quad (4)$$

$$P_{33} = \frac{\alpha^2 \lambda^2}{L_{11}^0}\left[\frac{1}{2}\lambda \ln\left(\frac{\lambda+1}{\lambda-1}\right) - 1\right],$$

where $\alpha$ is the aspect ratio of the inclusion and $$\lambda = \left(\frac{L_{11}^0}{L_{11}^0 - \alpha^2 L_{33}^0}\right)^{1/2}.$$

The resulting effective VTI medium has $L_{22} = L_{11}$.

Since grains and pores in rocks generally are not perfectly aligned, Willis's formula is modified to account for the orientation distributions of different constituent phases. In calculating the effective permeability, Xu and White (1998) discussed a scheme to handle the orientation distribution that was described with a normal distribution. This scheme is readily applicable to the calculation of other physical properties (elasticity and resistivity). For example, consider the rocks consisting of spheroidal constituents with the orientation distribution density function for the r-th phase, $w_r(\theta, \beta)$, given by $$\int_0^{2\pi}\int_{-\pi/2}^{\pi/2} w_r(\theta,\beta)\sin\theta\, d\theta\, d\beta = 1, \quad (5)$$

where θ is the polar angle between the vertical direction and the normal to a spheroidal constituent, and β is the azimuth of the constituent. A rotation matrix can be defined as $$A = \begin{bmatrix} \cos\theta\cos\beta & -\sin\beta & \sin\theta\cos\beta \\ \cos\theta\sin\beta & \cos\beta & \sin\theta\sin\beta \\ -\sin\theta & 0 & \cos\beta \end{bmatrix}. \quad (6)$$

Willis's formula (Equation 1) is then rewritten as $$L = \sum_{r=1}^{n} c_r X^r(\theta, \beta) \left[\sum_{r=1}^{n} c_r Y^r(\theta, \beta)\right]^{-1}, \quad (7)$$

where $X_{ij}^r(\theta,\beta) = \int_0^{2\pi} \int_{-\pi/2}^{\pi/2} w_r(\theta,\beta) A_{im} A_{jn} X_{mn}^r(0,0) \cdot \sin\theta d\theta d\beta,$ $Y_{ij}^r(\theta,\beta) = \int_0^{2\pi} \int_{-\pi/2}^{\pi/2} w_r(\theta,\beta) A_{im} A_{jn} Y_{mn}^r(0,0) \cdot \sin\theta d\theta d\beta,$ $X_r(0,0) = L_r[I + P_0(L_r - L_0)]^{-1},$ and $Y_r(0,0) = [I + P_0(L_r - L_0)]^{-1}.$ The effective elasticity tensor can also be determined from Willis's formula by using the stress-strain relationship in the governing equation and a fourth-rank elasticity tensor $c_{ijkl}$ (i, j, k, l=1, 2, 3) to evaluate the quantities in equation 1. Alternatively, other models such as DEM combined with Kuster and Toksoz's (1974) method can be used for calculating the effective elasticity tensor.

To satisfactorily characterize the microscopic structure of rocks that varies significantly with geological environment, a rock physics model that handles different types of pores and solid grains is needed. The solid part consists typically of quartz, clay, calcite, and/or dolomite, where calcite and dolomite are commonly found in carbonates. The pore system can be partitioned into different pore types such as: 1) interparticle pores, 2) clay-related pores, 3) microcracks, and 4) stiff pores. To each pore type is assigned values of pore aspect ratio, orientation distribution, and connectivity. For example, clay-related pores typically are less rounded than interparticle pores. They may have better alignment and can be treated as isolated from other pore spaces. Given their extremely small pore size, clay-related pores, if being water-wet, are typically filled with brines. Stiff pores generally represent the rounded modic pores or vugs in carbonate rocks. In clastic cases, volumes of stiff pores may be set to zero.

In one embodiment of the present invention's rock physics modeling of conductivity for sand/shale sequence, a rock sample is partitioned into five types of constituents: 1) a non-conducting solid phase; 2) a clay mineral phase with a finite but very small conductivity; 3) a randomly oriented sand-related pore fluid phase with conductivity $C_{we}$; 4) a clay-related pore fluid phase with the same pore fluid conductivity but with a preferred pore orientation; and 5) a non-conducting hydrocarbon phase. For conductivity, the pore connectivity is expressed through a percolation factor $F_C$:

$$C_H = F_C C_{we} + (1 - F_C) C_m, \quad (8)$$

where $C_H$, $C_{we}$, and $C_m$ denote the conductivity tensors of the reference medium, formation water, and solid matrix. The percolation factor $F_C$ describes the degree to which the fluid paths accord with a parallel tube model. This factor can be estimated from 3D image of rock samples or from the experience of practitioners. The formation water conductivity $C_{we}$ of clay minerals is simulated by Waxman-Smits equation (1968)

$$C_{we} = C_w + C_e = C_w + B \cdot \beta \cdot Q_v, \quad (9)$$

where $C_w$ is water conductivity and $C_e$ is the conductivity from clay counter-ions within the ionic double later. Parameter B is the equivalent conductance of clay exchange cations (in ohm cm$^2$ meq$^{-1}$) which is a function of the conductance of formation water. Parameter $Q_v$ is a function of the cation exchange capacity (CEC) of clay minerals, clay content, porosity and density of dry clays. Parameter β is a temperature correction coefficient.

As stated, the present invention involves procedures to calibrate the rock physics relationship between rock parameters and geophysical responses within a region of interest and, by using the calibrated relationship, to predict anisotropic resistivity volume from seismic data. FIG. 1 is a flowchart describing basic steps in one embodiment of the present inventive method.

In step 101, at least one well is selected within the region of interest. Well data, which may include various types of log data and/or core data, are obtained (to be used in later steps for anisotropic rock physics conditioning and modeling).

In step 102, rock properties, e.g., shale content (Vshale), porosity, water saturation (Sw), temperature, pressure, and fluid salinity, are estimated from well logs such as gamma ray, density, neutron porosity, sonic, and various resistivity (deep, medium, shallow, and micro) logs or core analyses. Fluid properties such as density, velocity (or bulk modulus), and resistivity, may be estimated as functions of temperature, pressure, fluid salinity, among others. For example, fluid conductivity increases with fluid salinity. Furthermore, elastic and electrical properties of the constituent minerals such as quartz, calcite, dolomite, and clay particles are determined. These typically include density, bulk and shear moduli (or alternatively, P- and S-wave velocities) and resistivity.

In step 103, parameters of pore structure such as pore size, aspect ratio, and alignment can be estimated from microscope photos or 3D CT scanning images of rock samples, if available. Other geological information such as environment of deposition can also be used to extract the pore structure parameters. In many cases, however, information of such parameters is not available or is incomplete. Hence, these parameters need to be adjusted in the rock physics modeling. For modeling the seismic responses, larger pores such as interparticle pores may be assumed to be connected, while water-wet clay pores may be considered isolated and fluid within pore space has no communication with other pore spaces due to relatively high capillary pressure. For modeling resistivity, pore connectivity may be determined through a percolation factor $F_C$ in Equation 8.

In step 104, a rock physics model is calibrated through comparison with log measurements. This step, along with steps 102 and 103, involve the following sub-steps, summarized in the flow chart of FIG. 2.

In step 201, all necessary input parameters for anisotropic rock physics modeling are prepared. This involves steps 102 and 103 in FIG. 1.

In step 202, a rock physics model that is able to consistently handle different types of geophysical responses as well as anisotropy is selected. Preferably, such a rock physics model was constructed by steps including 1) building a reference background for the solid matrix; and 2) calculating the perturbation to the reference background to obtain effective properties.

In one embodiment of the invention, the rock physics model uses the micro-porosity model to calculate the effective elastic properties and Willis's formula to calculate the effective electrical properties. In this embodiment, elastic and electrical properties of the solid rock frame are obtained through averaging different types of minerals components (e.g., quartz, calcite, dolomite, and clay particles) using, e.g., the Hill Average mixing law (Hill, 1963). For the isotropic background, the elastic properties are expressed through bulk and shear moduli (or P-, S-wave velocities and density), and the electrical properties are expressed through resistivity or conductivity. Perturbation to the reference background is computed through the contribution of each constituent of the pore system to the overall properties. Since the pore structure of a rock sample can be complicated, different types of pores such as inter-particle, equant, clay pores, microcracks, and fractures need to be treated differently depending on their shapes, orientations, and pore connectivity. In calculating the perturbation of the elastic properties, the connectivity between different pores is preferably determined according to pore sizes. Larger pores such as interparticle pores are considered to be connected, while small pores such as clay pores and microcracks are considered to be effectively isolated. Fluids within these pores have no communication with fluids in other pores due to relatively high capillary pressure. After pore type partitioning, a mixture of fluids is determined for different types of pores using a fluid mixing law, e.g., Wood suspension model. The mixed fluid is then introduced into different pores using an anisotropic Gassmann fluid substitution method (Brown and Korring a, 1975). This will give the effective elastic tensor of the rocks. In calculating the perturbation of the electrical properties, different types of pores are introduced into the Willis formula in a straightforward way to obtain the effective resistivity tensor.

To calculate the effective tensors for both elastic and electrical properties, different orientation distributions are assigned to different constituents, which contribute to the effective anisotropy. For example, sand grains are usually considered to be randomly oriented, while clay particles and microcracks are preferably aligned around horizontal and vertical directions, respectively.

An alternative method for rock physics modeling is to use Willis's formula to calculate both effective elastic and electrical properties. Indeed, there are many possibilities to establish the rock physics relationship for elastic and electrical properties, each associated with certain assumptions and limitations. For example, the Backus averaging scheme can be used to predict anisotropic velocity and anisotropic resistivity (Backus, 1962), but it is only applicable to finely-layered media. The selected rock physics model needs to be applicable to the type of rocks of interest.

Typically, the rock physics model selected or constructed in step 202 is an initial model which is then improved in the usual model updating process. That iterative process is outlined in step 203-205. In step 203, the elastic stiffness (or its inverse, compliance) and resistivity (or its inverse, conductivity) tensors at each depth are calculated using the anisotropic rock physics model. The calculated effective properties may include P- and S-wave sonic logs, density, velocity anisotropy, resistivity, and resistivity anisotropy. The velocity anisotropy may be represented through Thomsen's anisotropic parameters $\in$, $\delta$, $\gamma$ (Thomsen, 1986). The resistivity anisotropy may be represented through the ratio of vertical and horizontal components of resistivity (Rv/Rh).

A preferred way of calculating these tensors is to invert a porosity profile from the measured P-wave sonic log and the estimated shale content and water saturation profile using the rock physics model described above, and then to forward calculate the effective properties using the same rock physics model and inverted porosity profile. Ideally, the calculated P-wave sonic log should be substantially identical to the measured one, while the calculated S-wave as well as resistivity logs are predicted from the measured P-wave log.

In step 204, the calculated logs are compared against the measured logs. For example, if cross-dipole resistivity log measurements are available, predicted resistivity logs of both Rv and Rh, then the resistivity ratio Rv/Rh, can be used for the comparison. If the comparison results in a misfit that is larger than a selected tolerance, then the method returns to step 201 to adjust one or more input parameters (step 205) of the rock physics model (e.g., pore aspect ratio and orientation) and recalculate the log responses. This calibration process is repeated until the calculated logs satisfactorily fit the measured, or another stopping condition is met. The eventual result is a calibrated anisotropic rock physics model at step 206. This process can be performed either for a whole depth section of the logs or for several sub-sections that provide depth-varying rock parameters, e.g., changing pore aspect ratio and orientation for over-pressured zones.

The calibrated anisotropic rock physics model from step 206 satisfactorily predicts the relationship between elastic and electrical properties at well locations. This relationship can be used for the prediction of 3D resistivity volumes from seismic data in the region of interest (see step 109 below).

Returning to the main flow chart of FIG. 1, in step 105, 3D seismic data that were acquired from the subsurface region of interest are separated into partial angle stacks in this particular embodiment of the invention. (Clearly step numbers in FIG. 1 do not necessarily imply the order in which steps must be performed.)

In step 106, a rock physics model, preferably the same as the one developed in the calibration process in step 104, is used for the seismic inversion of porosity and shale content. One reason why the rock physics model in step 106 does not necessarily have to be the same model as the one in step 104 is that the model used for seismic inversion (the model of step 106) needs to be able to predict only elastic properties whereas the model of step 104 needs to also be able to predict electrical properties. For example, the model disclosed by Saltzer et al. (2007) is suitable for step 106.

In step 107, 3D data volumes of shale content (Vshale) and porosity are prepared. This is done by inversion of the 3D seismic data from step 105, which involves forward modeling to generate synthetic seismic data using the rock physics model from step 106, comparing to the actual seismic data, then adjusting elastic properties of the model, and repeating the process until satisfactory convergence is achieved. The adjusted elastic properties from the model may then be related to porosity and Vshale.

In step 108, an optional step, data "traces" of Vshale and porosity that correspond to the well locations identified in step 101 are extracted from the 3D volumes of Vshale and porosity. At the well locations, the Vshale and porosity derived from seismic data are different from the log-derived ones from step 102 mainly because of different frequency contents and the uncertainties associated with the seismic inversion and log measurements.

Despite the lower resolution as compared to log data, the Vshale and porosity derived from seismic data can optionally be used in the calibration of the rock physics model in step 104. Ideally, using these data as part of the input parameters for the rock physics modeling provides the background trend of anisotropic velocity and anisotropic resistivity as compared to log responses. If the comparison is not satisfactory, one or more of the input parameters (e.g., pore aspect ratio and orientation) need to be adjusted and this re-activates the calibration process 205 of the rock physics model.

In step 109, seismic-to-resistivity transformation is applied. This involves the interpolation or extrapolation of the calibrated rock physics model to the 3D region of interest. The meaning of the term calibrated rock physics model includes the input parameters of the rock physics model such as water saturation, temperature, pressure, salinity, pore aspect ratio, orientation, as well as elastic and electrical properties for minerals and fluids, except the log-derived Vshale and porosity since Vshale and porosity are prepared from the seismic inversion (step 107).

Where there are more than one well in the region of interest, the rock physics model can be calibrated for each well location following steps 101 through 104, and then interpolated to build the rock physics relationships for the entire region. The interpolation process preferably relies on geological interpretation of seismic attributes data, with extension of the rock physics relationship to the same faces within the formation.

The seismic-to-resistivity transformation of step 109 may be carried out for each depth and each trace (i.e., lateral location) within the region of interest. With the input rock parameters from steps 102 and 103 and the seismic-derived Vshale and porosity from step 107, the rock physics model 104 is used to calculate the effective resistivity tensor as described previously—see Equation (1) or (7). For a sand-shale system, the resulting resistivity tensor typically has TI (transverse isotropy) symmetry and has two independent resistivity components such as horizontal (Rh) and vertical components (Rv) for TI with vertical principle direction (VTI). (Step 110)

Although the present inventive method is disclosed using a 3D seismic dataset as an example, it is flexible. It can be applied to the entire 3D region or a subset of the region, e.g., the reservoir interval within a 3D volume, or a 2D section. Furthermore, the integrated workflow is flexible in that the log calibration of the rock physics model and seismic inversion of porosity and shale volumes can be carried out independently, or alternatively, the log calibration of the rock physics model can be merged into the process of the seismic inversion to obtain a rock physics relationship that is consistent for elastic and electrical properties.

The present inventive method is an improvement over empirical rock physics models, as it is a physics-based method and handles many in-situ rock parameters consistently. Empirical rock physics models typically cannot handle more than three variables through curve fitting or cross-plotting. Without an analytical rock physics basis for the model, there will be too much ambiguity in establishing relationships among many rock properties as well as physical properties. Furthermore, empirical rock physics models lack predictive power.

The present inventive method is an improvement over techniques commonly used to determine resistivity from seismic reflectivity or impedance in that it predicts resistivity from seismic-derived volumes of porosity and shale content. It honors different types of data including seismic, resistivity, well log, and core data. Furthermore, by using sonic and resistivity log measurements in the calibration of the rock physics model, the inventive method generates consistent results for velocity and resistivity. The analytical rock physics model used in this inventive method predicts effective anisotropy for both velocity and resistivity.

Figure 3:
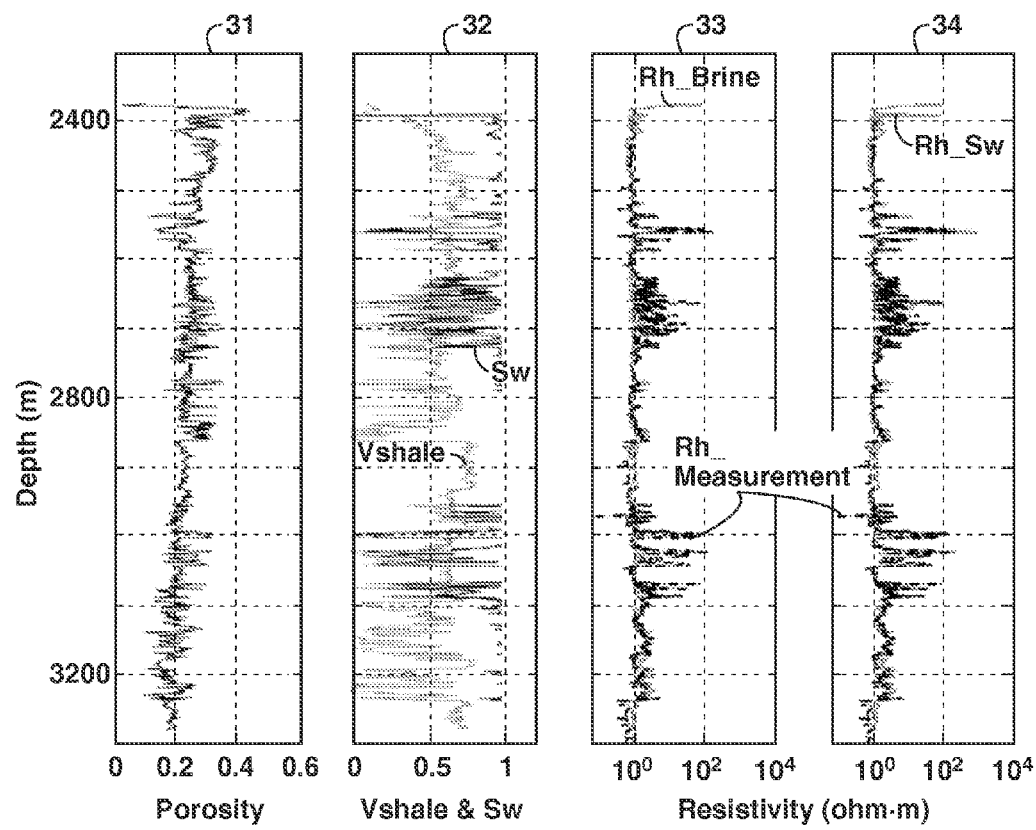
FIG. 3 shows the log to log calibration of a rock physics model for one well. Panel 1 is the porosity calculated from sonic log. Panel 2 displays the water saturation curve and shale content calculated from gamma ray log. Panel 3 is the resistivity prediction using porosity and shale content in panels 1 and 2 by assuming purely brine saturation. Panel 4 is the resistivity prediction using water saturation curve in panel 2.

An example of calibrating the rock physics model in the present inventive method is now described. In this example, a well is selected in step 101 of FIG. 1. Temperature and salinity profile, which are needed to calculate fluid conductivity, are obtained in step 102. The temperature correction of formation water is based on the following relationship:

$$R = R_0 \times \frac{T + 6.67}{200 + 6.67}, \qquad (10)$$

where $R_0$ and R are, respectively, the resistivity before and after the temperature (T) correction. The temperature coefficient in the Waxman-Smits equation (equation 9) is adjusted to calculate fluid conductivity in shale. FIG. 3 shows the calibration results of an anisotropic rock physical model as described in the discussion of equations 1-9. Panel 31 displays the porosity profile derived from the P-wave sonic log. Panel 32 displays the shale content (Vshale) as the lighter shaded curve and water saturation (Sw) as the darker shaded curve. These parameters, combined with other rock and fluid parameters such as pore aspect ratio and bulk and shear moduli of grain minerals, are then introduced into the rock physics model to predict the shear-wave sonic log(not shown in this drawing) and resistivity (panels 33 and 34). Panels 33 and 34 compare the measured horizontal component of resistivity with the prediction for two scenarios: assuming full water saturation (i.e., Sw=1 throughout the whole depth range) and using the measured Sw profile. As shown in FIG. 3, the porosity 31 was inverted from a sonic log and the shale content in panel 32 was calculated from gamma ray log (step 102 in FIG. 1). Other parameters in the rock physics model (e.g., pore aspect ratio and orientation distribution) are adjusted (step 205) to predict resistivity and horizontal resistivity is compared with log measurements (step 204). In panel 33 of FIG. 3, brine is assumed to represent the fluid phase, i.e., water saturation is unity throughout the whole depth range. The predicted resistivity Rh_brine, which is the light shaded curve in panel 33, generally matches the measurements (the dark shaded data in panel 33) in both shale (high Vshale) and sand (low Vshale) regions except the peaks in the resistivity measurement, which correspond to hydrocarbon bearing intervals (a narrow zone at 2560 m, a second zone at 2630-2730 m, and a third zone at 3000-3090 m). In panel 34, a water saturation log (the darker-shaded curve in panel 32) is provided to account for the hydrocarbon substitution. The lighter-shaded plot in panel 34 represents predicted resistivity Rh_Sw, and it indicates both the background resistivity trend and hydrocarbon zones. The predicted resistivity agrees well with measured data (the darker shaded plot in panel 34).

Figure 4A:
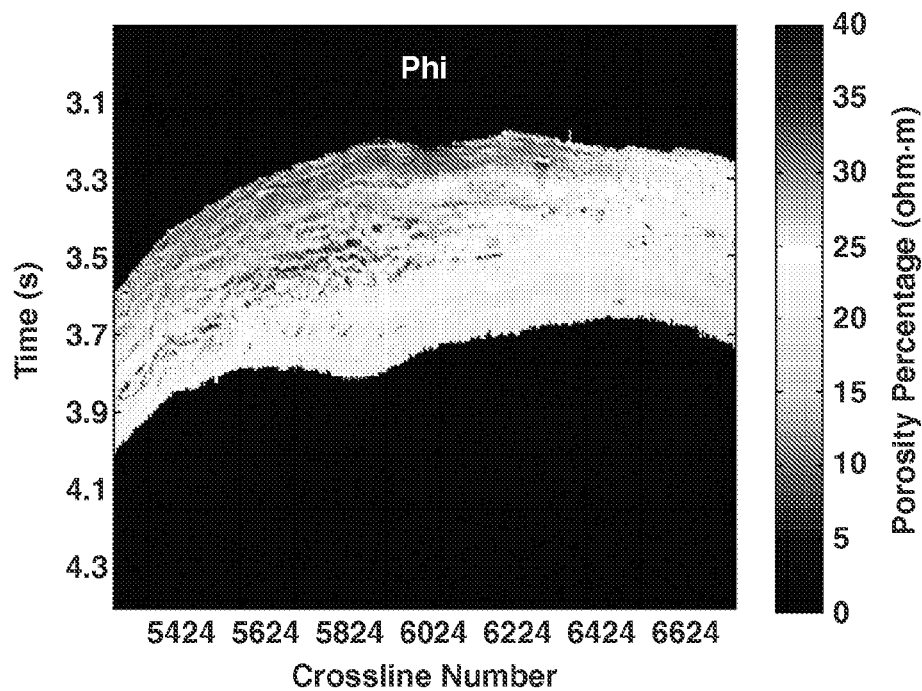
FIGS. 4A-B show, respectively, a slice of porosity (Phi) and shale content (Vsh) volumes derived from seismic inversion (Saltzer et al., 2005).
Figure 4B:
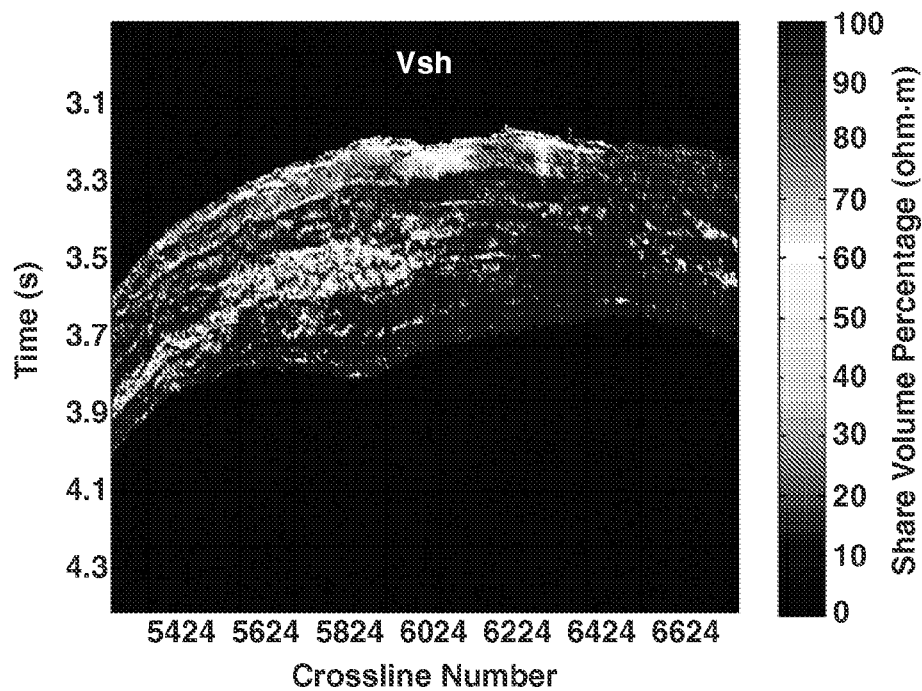
Figure 5A:
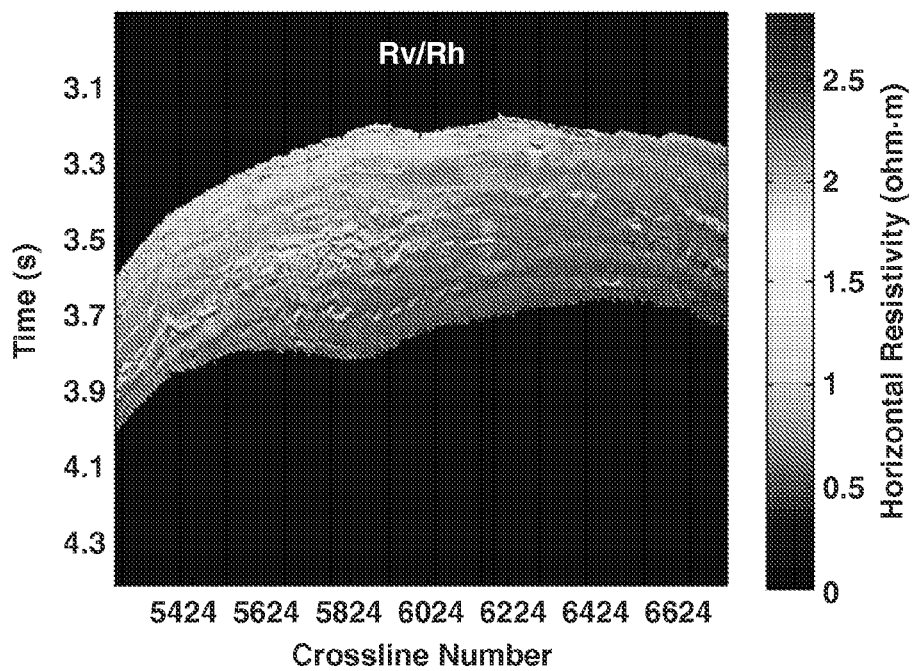
FIGS. 5A-B show, respectively, a slice of horizontal (Rh) and vertical (Rv) components of the predicted resistivity volumes.
Figure 5B:
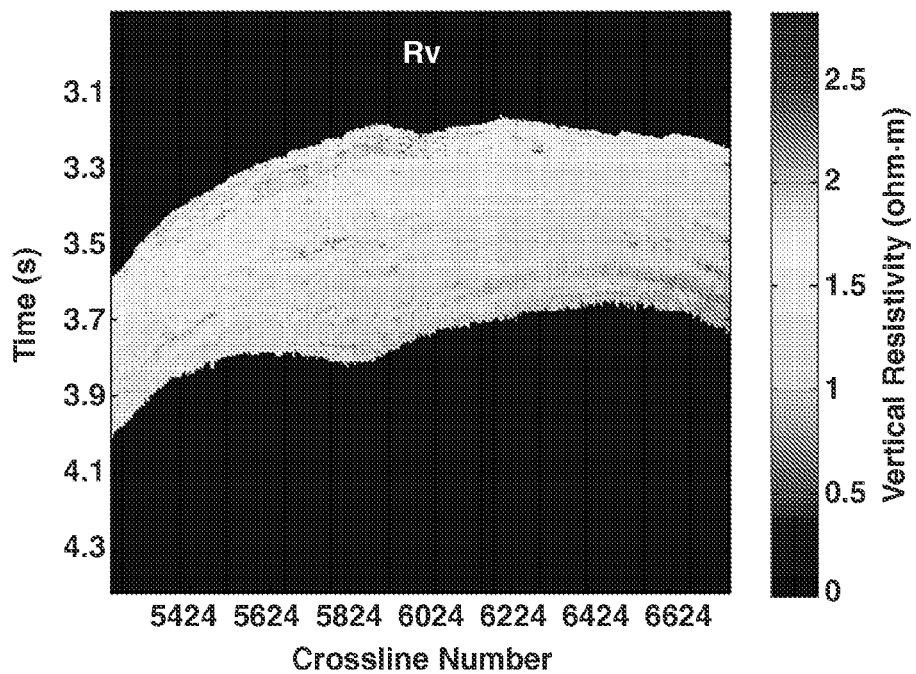
Figure 6:
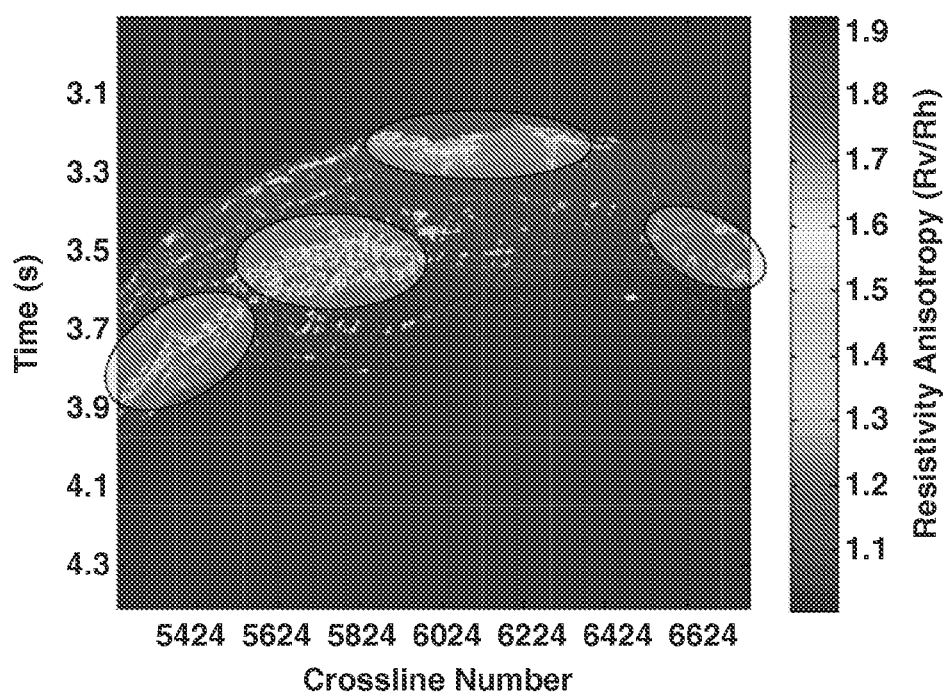
FIG. 6 shows a slice of resistivity anisotropy defined through ratio of vertical and horizontal resistivity components. Shaded areas indicate weaker anisotropy that corresponds to less shaly region.

An example of seismic prediction of resistivity volumes is illustrated by FIGS. 4-6, which are black and white reproductions of colored displays. The results shown in FIGS. 4-6 were obtained using the rock physics model calibrated with the logs shown in FIG. 3. FIGS. 4A-B show slices of porosity (4A) and shale content (4B) volumes from seismic inversion. (The results of step 107) Depth represented by seismic travel time is displayed on the vertical axis, and horizontal position represented by survey cross-line number is displayed on the horizontal axis. FIGS. 5A-B show slices of the predicted (step 110) anisotropic resistivity volumes, Rh and Rv, resulting from the two data volumes in FIGS. 4A-B. Structure of the predicted resistivity resembles that of porosity and shale content. Predicted resistivity anisotropy defined as ratio of vertical and horizontal components of resistivity, Rv/Rh, is shown in FIG. 6. Sand intervals are nearly isotropic (Rv/Rh≈1) while shale intervals are generally anisotropic (transversely isotropic) with resistivity ratio close to 2. A good correlation can be noted between Rv/Rh and shale content (FIG. 4B), which indicates the link between resistivity anisotropy and shale anisotropy.

Figure 7:
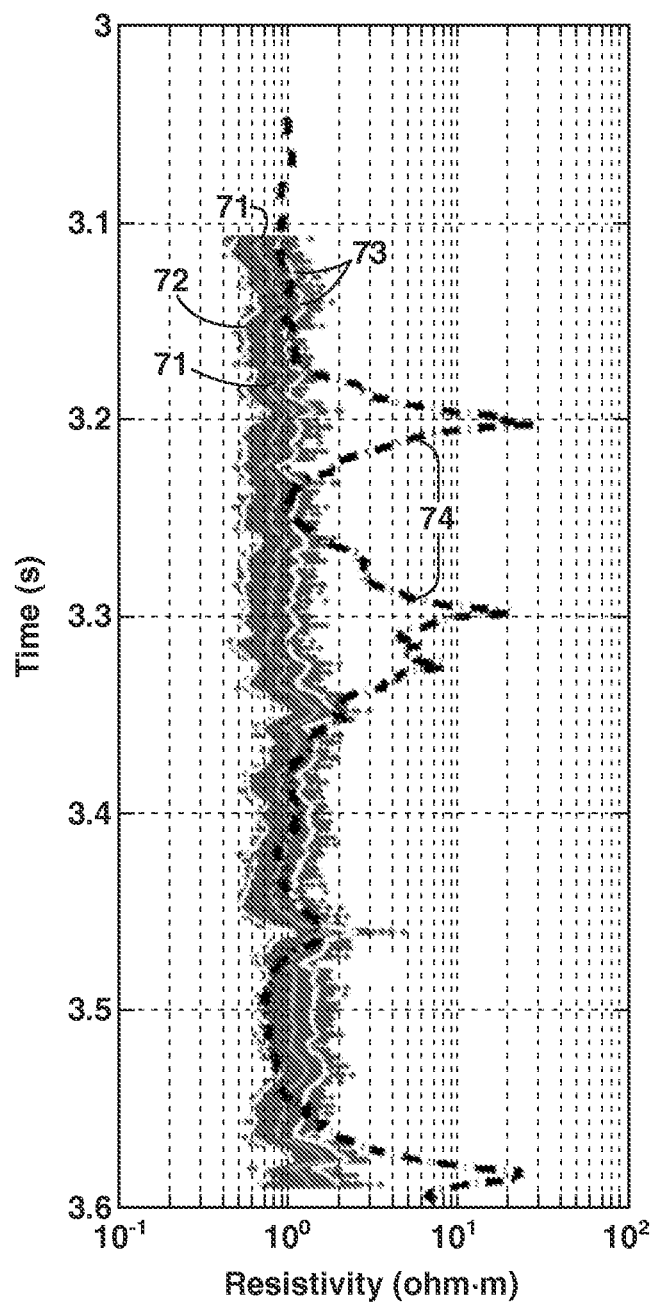
FIG. 7 shows the Monte Carlo simulation results of the horizontal resistivity component for one trace. Curves 71 indicates the mean value of the predicted Rh. Curves 72 and 73 indicate the variance of the predicted Rh. A cloud of points correspond to 1000 realizations of the Monte Carlo simulation. The dash-dotted curve 74 is the log measurement of Rh applied with low-pass filter. Three histograms of the predicted resistivity are displayed at different time (or alternatively at different depth).

Finally, an example of the uncertainty analysis of seismic prediction of resistivity volumes is illustrated by FIG. 7. At each point of the volume, a Gaussian distribution for various rock parameters is used. This includes percolation factor $F_C$ in Equation 8 (mean=0.5, variance=0.2), parameter $\beta$ in Equation 9 (mean=0.4, variance=0.2), $R_0$ in Equation 10 (mean=0.3 ohm·m, variance=0.1 ohm·m), temperature (mean=70° C., variance=10° C.), sand aspect ratio (mean=0.12, variance=0.01), clay aspect ratio (mean=0.035, variance=0.005), and the orientation for sand and clay (mean=45°, variance=10). Furthermore, the uncertainty of seismic-derived porosity and shale content are obtained from the seismic inversion. In principle, any combination of the uncertainty for the listed parameters could be used for the prediction of the uncertainty for the resistivity. Hence, a Monte Carlo simulation is carried out for 1000 simulations to predict the mean value and variance ($\sigma$) of resistivity. FIG. 7 shows the predicted mean value of the horizontal resistivity component (71) as well as its variance (72 and 73). Also, a measured resistivity log, Rh, is applied with a low-pass filter (high cut frequency=60 Hz) to fit into the seismic frequency range. Overall, the filtered log (74) curve is within the variance cloud (gray band) of the predicted resistivity except the hydrocarbon bearing intervals since full water saturation (Sw=1) is used. This indicates that seismic-derived resistivity volumes predict the background trend of the true resistivity structure when water saturation is assumed. They can also be used to predict the hydrocarbon bearing intervals if accurate water saturation profile is provided.

In hydrocarbon exploration, it is often useful to relate effective physical properties to one another. For example, if reliable porosity and shale volumes can be estimated from inversion of seismic data, this can be used for predicting the resistivity structure of the earth's subsurface. Since the frequency range of seismic data is generally higher than that of resistivity data from, e.g., CSEM acquisition, the seismic-derived resistivity volume can reveal more details of the resistivity structure than resistivity inversion of CSEM data. Moreover, as illustrated from the example, if an accurate water saturation profile is provided, the predicted resistivity can help to detect potential hydrocarbon reservoirs.

The present inventive method can be applied to anisotropic rocks where the effective physical properties and optionally the local properties vary with directions of measurements. For example, clay particles can be intrinsically anisotropic (transversely isotropic). Intrinsic anisotropy contributes to the effective anisotropy through the volume fraction and geometry of the associated constituent as well as its interaction with other constituents. While the magnitude of velocity anisotropy defined by Thomsen parameters $\in$ and $\delta$ is typically on the order of tens of percent, the magnitude of resistivity anisotropy defined through Rv/Rh can be more significant, e.g., up to hundreds of percent.

The present inventive method can be applied to more complicated geological environments such as carbonate, fractured reservoirs, and other unconventional resources such as heavy oil, shale gas, and oil shale. A key element for successfully implementing this method is the rock physics model that describes the relationship between elastic and electrical properties. For example, in carbonate rocks, a rock physics model handling complex pore systems, which consists of vugs, modic pores, interparticle pores, intraparticle (or intraframe) pores, fractures, and micropores, is needed. Similarly, for gas shale or heavy oil sand, special constituents such as organic material or heavy oil should be considered in building the rock physics relationships for velocity and resistivity.

The inventive method can be applied to different scenarios of rock physics prediction of elastic and electrical properties. By varying a selected set of rock parameters with a reasonable random distribution, the predicted effective physical properties can be analyzed to indicate the uncertainty associated with different rock parameters. For example, by changing the fluid saturation, the predicted resistivity can change dramatically. If information on fluid saturation is unavailable, a background trend of resistivity structure can be predicted by assuming purely brine saturation.

The foregoing application is directed to particular embodiments of the present invention for the purpose of illustrating it. It will be apparent, however, to one skilled in the art, that many modifications and variations to the embodiments described herein are possible. With the benefit of the disclosure herein, persons of ordinary skill in the art will recognize that the inventive method may be applied more generally to predict any physical property, e.g., permeability, from other properties that can be estimated more easily and reliably. All such modifications and variations are intended to be within the scope of the present invention, as defined in the appended claims. Persons skilled in the art will also readily recognize that in preferred embodiments of the invention, at least some of the steps in the present inventive method are performed on a computer, i.e. the invention is computer implemented.

REFERENCES

Backus, G. E., "Long-wave elastic anisotropy produced by horizontal layering," *Journal of Geophysical Research* 67, 4427-4440 (1962).

Bristow, J. R., "Microcracks, and the static and dynamic elastic constants of annealed heavily coldworked metals," *British Journal of Applied Physics* 11, 81-85 (1960).

Brown, R. J. S., and Korring a, J., "On the dependence of the elastic properties of porous rock on the compressibility of the pore fluid," *Geophysics* 40, 608-616 (1975).

Carazzone, J. J., O. M. Burtz, K. E. Green, and D. A. Pavlov, "Three dimensional imagining of marine CSEM data," 75th Annual International Meeting, *SEG, Expanded Abstracts,* 575-578 (2005).

Carcione, J. M., B. Ursin, and J. I. Nordskag, "Cross-property relations between electrical conductivity and the seismic velocity of rocks," *Geophysics* 72, 193-204 (2007).

Gassmann, F., "Elastic waves through a packing of spheres," *Geophysics* 16, 673-685 (1951).

Haber, E., and U. M. Ascher, "Fast finite volume simulation of 3D electromagnetic problems with highly discontinuous coefficients," *SIAM J. Sci. Computing* 22 (6), 1943-1961 (2001).

Hacikoylu, P., J. Dvorkin, and G. Mal/1(o, "Resistivity-velocity transforms revisited," *The Leading Edge* 25, 1006-1009 (2006).

Hill, R., "Elastic properties of reinforced solids: Some theoretical principles," *Journal of the Mechanics and Physics of Solids* 11, 357-372 (1963).

Hornby, B., L. M. Schwartz, and J. A. Hudson, "Anisotropic effective-medium modeling of the elastic properties of shales," *Geophysics* 59 (10), 1570-1583 (1994).

Hoversten, G. M., G. A. Newman, H. F. Morrison, and E. Gasperikova, "Reservoir characterization using crosswell electromagnetic inversion: A feasibility study for the Snorre field, North Sea," *Geophysics* 66 (4), 1177-1189 (2001).

Kachanov, M., I. Sevostianov, and B. Shafiro, "Explicit cross-property correlations for porous materials with anisotropic microstructures," *Journal of the Mechanics and Physics of Solids* 49, 1-25 (2001).

Kuster, G. T., and M. N. Toksoz, "Velocity and attenuation of seismic waves in two phase media, Part 1: Theoretical formulation," *Geophysics* 39, 587-606 (1974).

Mendrofa, D. M. F., and B. Widarsono, "An analytical formulation of seismic-derived resistivity," *American Association of Petroleum Geologists Bulletin* 91, 8 pages (2007).

Pointer, T., E. Liu, and J. A. Hudson, "Seismic wave propagation in cracked porous media," *Geophysical Journal International* 142, 199-231 (2000).

Portniaguine, O., Y. Wang, and H. Chen, "Building electromagnetic model using seismic reflectivity," 76th Annual International Meeting, *SEG Expanded Abstracts*, 840-843 (2006).

Saltzer, R. L., C. J. Finn, and O. Burtz, "Predicting Vshale and porosity using cascaded seismic and rock physics inversion," *The Leading Edge* 24, 732-736 (2005).

Saltzer, R. L., C. J. Finn, and R. Lu (2007), "Method for obtaining porosity and shale volume from seismic data," PCT Patent Publication No. WO/2007/001759.

Sen, P. N., C. Scala, and M. H. Cohen, "A self-similar model for sedimentary rocks with applications to the dielectric constant of fused glass beads," *Geophysics* 46, 781-795 (1981).

Thomsen, L., "Weak elastic anisotropy," *Geophysics* 51, 1954-1966 (1986).

Thomsen, L., "Elastic anisotropy due to aligned cracks on porous rock," *Geophysical Prospecting* 43, 805-829 (1995).

Wang, T., "A weak-anisotropy approximation to multicomponent induction responses in cross-bedded formations," *Geophysics* 71, F61-F66 (2006).

Waxman, M. H., and L. J. M. Smits, "Electrical conductivities in oil-bearing shaley sands," *The Society of Petroleum Journal* 8, 107-122 (1968).

Willis, J. R., "Bounds and self-consistent estimates for the overall properties of anisotropic composite," *Journal of Mechanics and Physics of Solids* 25, 185-202 (1977).

Xu, S., and R. E. White, "A new velocity model for clay-sand mixtures," *Geophysical Prospecting* 43, 91-118 (1995).

Xu, S., and R. E. White, "A physical model for shear-wave velocity prediction," *Geophysical Prospecting* 44, 687-717 (1996).

Xu, S., and R. E. White, "Permeability prediction in anisotropic shally formations, In Core-Log Integration," *London Geological Society Special Publication No.* 136, 225-236 (1998).

The invention claimed is:

1. A method for predicting an anisotropic electrical property of a subsurface region from seismic and well data, wherein the term well data can include well logs or core analyses or both from at least one well in the subsurface region, comprising the following steps:
   (a) choosing a mathematical form of a rock physics model relating both elastic and electrical properties to rock properties of the subsurface region, and able to predict anisotropic behavior in a subsurface region being modeled;
   (b) calibrating the model by using well data from one or more wells; and
   (c) using the model and location dependent rock properties obtained from inverting seismic data to predict values of an electrical property at a plurality of locations away from the one or more wells in the subsurface region.

2. The method of claim 1, wherein the location dependent rock properties obtained from inversion of seismic data are data volumes of shale volume fraction and porosity.

3. The method of claim 2, wherein using the model and location dependent rock properties obtained from inverting seismic data to predict values of an electrical property at a plurality of locations away from the one or more wells in the subsurface region comprises selecting a location away from a well and obtaining the corresponding values for shale volume fraction and porosity from their seismic-derived data volumes, substituting these values into the mathematical form of a rock physics model to obtain one or more resistivity tensor components, then repeating for a plurality of other selected locations, thereby generating a data volume of resistivity component values.

4. The method of claim 3, wherein an elastic property is seismic wave propagation velocity and an electrical property is resistivity.

5. The method of claim 1, further comprising using the predicted values of the electrical property to assess the commercial hydrocarbon production potential of the subsurface region.

6. The method of claim 1, wherein the rock properties are selected from a group consisting of shale content, porosity, fluid saturation, pressure, temperature, salinity, compressional wave sonic log, shear wave sonic log, and resistivity log.

7. The method of claim 1, wherein the elastic properties are selected from a group consisting of: bulk modulus, shear modulus, compressional wave velocity (alternatively, slowness or transit time), shear wave velocity (alternatively, slowness or transit time), Vp/Vs ratio, elasticity tensor, and anisotropic parameters.

8. The method of claim 1, wherein the electrical properties are selected from a group of parameters consisting of: conductivity, resistivity, and anisotropic parameters.

9. The method of claim 1, wherein the calibration of the model using well data comprises iterative forward modeling, using the chosen rock physics model, to calculate P-wave and S-wave logs, comparing the calculated logs to measured logs, then adjusting the model's parameters including one or more of electrical, elastic, rock property, and anisotropy parameters to obtain an updated model, then forward modeling again with the updated model and so on until misfit between calculated and measured logs is within a pre-selected tolerance or other stopping condition is met.

10. The method of claim 9, wherein the model's parameters include porosity and shale volume fraction, and those parameters are estimated from inversion of well data.

11. The method of claim 9, wherein the model's parameters include porosity and shale volume fraction, and those parameters are estimated from the inversion of seismic data.

12. The method of claim 1, wherein the inversion of seismic data uses the chosen rock physics model.

13. The method of claim 1, wherein the inversion of seismic data uses a second rock physics model, said second model relating rock properties to at least elastic properties.

14. The method of claim 1, wherein the mathematical form of the chosen rock physics model is based on Willis's (1977) formula.

15. The method of claim 1, wherein the mathematical form of the chosen rock physics model uses a micro-porosity model to calculate effective elastic properties and Willis's (1977) formula to calculate effective electrical properties.

16. The method of claim 1, wherein in the rock physics model, velocity anisotropy is represented through Thomsen's anisotropic parameters $\in$, $\delta$, $\gamma$ (Thomsen, 1986), and resistivity anisotropy is represented through the ratio of vertical and horizontal components of resistivity (Rv/Rh).

17. The method of claim 1, wherein the calibration of the model using well data from one or more wells is performed assuming 100% water saturation.

18. The method of claim 9, further comprising:
(a) selecting unknown parameters of the rock physics model and guessing initial values for these unknown parameters;
(b) calculating elastic and resistivity tensors, including Thomsen's (1986) anisotropic parameters ($\in$, $\delta$, and $\gamma$) and a ratio of two principle resistivity components, using the rock physics model;
(c) adjusting the unknown parameters to match elastic and electrical properties measured from well logs to those calculated from the rock physics model; and
(d) outputting of final parameters after iterative updating of the model is completed.

19. The method of claim 18, wherein the elastic and electrical properties are calculated for rocks containing different types of constituents with selected distributions of orientations.

20. The method of claim 18, wherein the resistivity ratio of two principle components is Rv/Rh for transversely isotropic medium with a vertical symmetry (VTI), where Rv and Rh are respectively, vertical and horizontal components of the resistivity tensor.

21. The method of claim 18, wherein the unknown parameters are selected from a group of parameters consisting of: aspect ratio, orientation, and connectivity of each constituent, and percolation factor.

22. The method of claim 21, wherein the listed group of unknown parameters is expanded to include any other parameter for which data are unavailable and is in a group consisting of: temperature, salinity, pressure, bulk and shear moduli, density, resistivity, velocity anisotropy, and resistivity anisotropy of each rock constituent.

23. The method of claim 1, wherein log measurements for calibrating the rock physics model are selected from a group consisting of: compressional wave sonic logs, shear wave sonic logs, and resistivity logs.

24. The method of claim 23, wherein resistivity logs are selected from multi-component resistivity data.

25. The method of claim 1, wherein the electrical property is resistivity and the location dependent rock properties are shale volume fraction and porosity, and wherein the chosen rock physics model of step (a) is used in the seismic inversion of step (c), and the log calibration of the rock physics model is merged into the seismic inversion to obtain a rock physics relationship for predicting at least one component of a resistivity tensor at locations away from the one or more wells from properties estimated or extracted from well data and the location dependent values of shale volume fraction and porosity derived from the inversion of seismic data.

26. A method for producing hydrocarbons from a subsurface region, comprising:
(a) conducting a seismic survey of the subsurface region and obtaining well logs from at least one well in the subsurface region;
(b) obtaining a predicted resistivity map or image of the subsurface region, said prediction being made using a method as described in claim 1, which is incorporated herein by reference, wherein the electrical property is resistivity;
(c) obtaining a prediction of the hydrocarbon potential of the subsurface region at least partly from the resistivity map or image; and
(d) in response to a positive determination of hydrocarbon potential, drilling a well into the subsurface region and producing hydrocarbons.

27. A method for predicting anisotropic resistivity in a subsurface region from seismic and well data, wherein the term well data can include well logs or core analyses or both from at least one well in the subsurface region, comprising the following:
(a) choosing a mathematical form of a rock physics model relating effective values of elastic and electrical properties to in-situ (i.e. microscopic) rock properties of the subsurface region, and able to predict anisotropic behavior in a subsurface region being modeled;
(b) calibrating the rock physics model using well data measuring elastic and electrical properties of the subsurface region at one or more well locations;
(c) obtaining data volumes for shale content and porosity from inversion of the seismic data;
(d) interpolating or extrapolating the calibrated rock physics model away from the at least one well; and
(e) generating a resistivity tensor data volume using the seismic-derived shale content and porosity volumes and the calibrated rock physics model.

28. The method of claim 27, further comprising estimating uncertainty of the resistivity tensor's components by:
(a) selecting a set of rock parameters of the calibrated rock physics model;
(b) selecting a probability-weighted distribution for each selected rock parameter;
(c) calculating effective values of elastic and resistivity tensors using the rock physics model for a plurality of realizations randomly selected from the probability-weighted rock parameter distributions;
(d) estimating mean values and variances of predicted effective values of elastic and resistivity tensors;
(e) obtaining well log measurements of elastic and resistivity tensors;
(f) comparing the well log measurements with the estimated mean values at the well log location or locations; and
(g) adjusting mean values and variances of the elastic and resistivity tensors, and repeating steps (b)-(f) until misfit in the comparing step is less than a pre-selected criterion or other stopping condition is met.

* * * * *